United States Patent [19]

Yurke

[11] Patent Number: 5,646,772
[45] Date of Patent: Jul. 8, 1997

[54] METHODS AND APPARATUS FOR A MULTI-ELECTRODE MICROMECHANICAL OPTICAL MODULATOR

[75] Inventor: Bernard Yurke, Plainfield, N.J.

[73] Assignee: Lucent Technologies Inc., Murray Hill, N.J.

[21] Appl. No.: 644,350

[22] Filed: May 10, 1996

[51] Int. Cl.$^6$ .................................................. G02B 26/00
[52] U.S. Cl. ........................ 359/290; 359/291; 359/295
[58] Field of Search .................................. 359/238, 263, 359/276, 290, 291, 295

[56] References Cited

U.S. PATENT DOCUMENTS

| | | | |
|---|---|---|---|
| 4,441,791 | 4/1984 | Hornbeck | 350/360 |
| 5,223,971 | 6/1993 | Magel | 359/295 |
| 5,231,532 | 7/1993 | Magel et al. | 359/295 |
| 5,287,215 | 2/1994 | Warde et al. | 359/293 |
| 5,500,761 | 3/1996 | Goosen et al. | 359/290 |
| 5,526,172 | 6/1996 | Kanack | 359/291 |

*Primary Examiner*—Mark Hellner

[57] ABSTRACT

A micromechanical optical modulator, and methods for operating the modulator are disclosed. The modulator has a membrane supported over a region of a substrate. At least two electrodes, and preferably more, are disposed on the membrane. Each electrode is in electrical contact with a controlled voltage source through a shift register for sequentially applying a voltage to the electrodes. An optical window for receiving an optical signal is defined between two adjacent electrodes. In operation, a voltage pulse is applied to the substrate and each of the electrodes. As the voltage is applied, an electrostatic force is generated, drawing the membrane towards the substrate and thereby generating a mechanical pulse in the membrane beneath each electrode. The pulses are propagated through the membrane to the optical window. The voltage pulses are timed so that the mechanical pulses reinforce one another creating a pulse or displacement in the membrane at the optical window equivalent to the sum of the pulses generated by each electrode. As the membrane is displaced from its initial position and moves toward the substrate, there is a change in an optical property of the modulator, such as its reflectivity to an optical signal. Thus, by changing the position of the optical window, relative to the substrate, an optical signal can be modulated.

44 Claims, 4 Drawing Sheets

METHODS AND APPARATUS FOR A MULTI-ELECTRODE MICROMECHANICAL OPTICAL MODULATOR

FIELD OF THE INVENTION

The present invention relates to micro-sized electromechanical optical modulators, and more particularly to optical modulators having low drive voltage requirements.

BACKGROUND OF THE INVENTION

Recently, there has been much interest in optical communications systems. Such systems find application in many areas, including telecommunications, aeronautics and remote sensing, to name a few. Optical signal modulators are typically a part of such communications systems.

Most electromechanical optical modulators are limited to data rates ranging between about 1 Mbits to 3 Mbits per second. It will be desirable, however, to attain operating speeds of about 10 Mbits per second or more for Ether Net and high-definition television (HDTV) applications. The data rate limitation arises for several reasons. One reason relates to drive voltage requirements. In most implementations, the operating speed of the modulator is approximately proportional to drive voltage, and a modulator operating at 10 Mbits per second may require a voltage in excess of 200 volts. For most modulator designs, dielectric breakdown of the modulator membrane or other parts of the modulator occurs near this voltage. During dielectric breakdown, the membrane or other structures cannot support the applied voltage. A current flows through the material, typically destroying it. In practice, it is desirable to operate at a voltage that is more than a factor of two less than the theoretical dielectric breakdown voltage, since imperfections in the materials may reduce the acceptable operating voltage. Moreover, the electronics supporting the modulator become more difficult and expensive to implement as the drive voltage increases.

As such, an electromechanical optical modulator having reduced operating voltage requirements compared with typical existing designs is needed.

SUMMARY OF THE INVENTION

A micromechanical optical modulator capable of operating at lower voltages than typical prior art micromechanical optical modulators is disclosed. The modulator has a membrane supported over a region of a substrate. At least two electrodes, and preferably more, are disposed on the membrane. Each electrode is in electrical communication with a controlled voltage source through a shift register or other means for sequentially applying a voltage to the electrodes. An optical window for receiving an optical signal is defined between two adjacent electrodes.

In operation, a voltage pulse is applied to the substrate and each of the electrodes. The voltage pulse is applied sequentially to the electrodes that are not adjacent to the optical window; the more remote electrodes receiving an earlier pulse. As the voltage is applied, an electrostatic force is generated, drawing the membrane towards the substrate. A displacement or mechanical pulse is thus generated in the membrane beneath each electrode.

Among other functions, the membrane provides a medium for the propagation of the mechanical pulses. The propagating pulses generated beneath each electrode reinforce one another creating a displacement in the membrane at the optical window equivalent to the number of electrodes times the displacement obtained when applying the voltage to a single electrode. In this manner, large membrane displacements can be generated from relatively low voltages.

As the membrane is displaced from its initial position and moves toward the substrate, there is a change in an optical property of the modulator. In one embodiment, the reflectivity of the modulator changes with such a change in membrane position. Such a change in reflectivity causes a change in a measurable property of an optical signal reflected from the modulator, e.g., the amplitude of the signal. In this manner, an optical signal is modulated.

BRIEF DESCRIPTION OF THE DRAWINGS

Further features of the invention will become more apparent from the following detailed description of specific embodiments thereof when read in conjunction with the accompanying drawings, in which like elements have like reference numbers and in which:

FIG. 2b is a timing diagram for the applied voltage and shows the response of the membrane at the optical window for the modulator of FIG. 2a;

FIG. 3b is a timing diagram for the applied voltage and shows the response of the membrane at the optical window for the modulator of FIG. 3a;

DETAILED DESCRIPTION OF THE INVENTION

Figure 1:
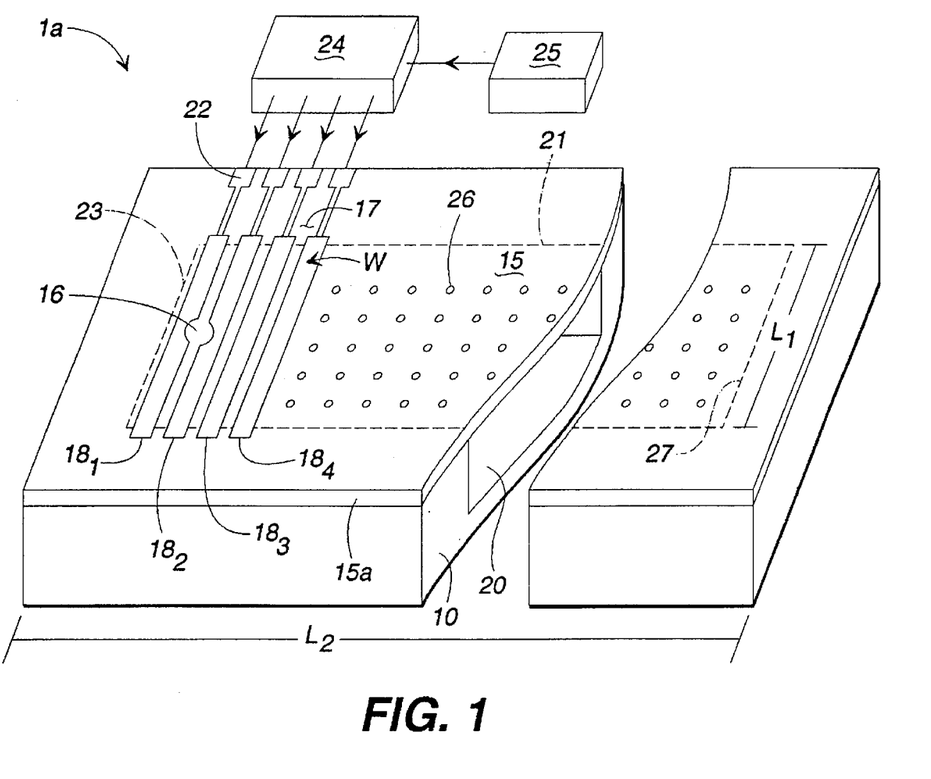
FIG. 1 is a perspective cutaway view of an embodiment of a low-voltage modulator according to the present invention.

FIG. 1 shows a preferred embodiment of a micromechanical low-voltage modulator 1a according to the present invention. The modulator 1a is configured as a clamped-plate transmission line similar to that disclosed in co-pending application Ser. No. 08/597,003 filed Feb. 5, 1996. That patent application, and all other patent applications, patents or other publications mentioned in this specification are incorporated by reference herein.

The modulator 1a includes a layer 15a supported by a substrate 10. There is cavity 20 defined within the substrate 10 underneath a portion of the layer 15a. A perimeter 21 of the cavity 20 defines a membrane 15 in the layer 15a. In the modulator 1a shown in FIG. 1, four electrodes $18_{1-4}$, electrically insulated from one another, are disposed on the membrane 15. It should be understood that in other embodiments, more or less than four electrodes 18 can be disposed on the membrane 15, as described in more detail later in this specification. In a preferred embodiment, an optical window 16 is defined between two adjacent electrodes, such as the electrodes $18_1$ and $18_2$. The electrodes $18_{1-4}$ are individually electrically connected to contacts 22, which are in turn electrically connected to a shift register 24. The shift register 24 receives a signal from a controlled voltage source, 25. While the shift register 24 and the controlled voltage source 25 are shown as two separate devices in FIG. 1, it should be understood that a single device incorporating both the shift register function and the controlled voltage source can be used.

Modulators according to the present invention can be fabricated on a silicon wafer or chip. Since the present modulators are compatible with silicon electronics, some or all of the drive and control electronics for the modulator can be located on such a chip with the modulator. Modulators according to the present invention can be packaged in a variety of ways. In one embodiment, the modulator is provided as a stand-alone device. In such an embodiment, the modulator is later attached to suitable control electronics, i.e., shift register 24 and controlled voltage source 25, and placed in optical communication with at least one optical fiber or other wave guide for delivering/ receiving an optical signal to/from the modulator. In another embodiment, the modulator, shift register and optical fiber form an integrated package. In such an embodiment, a plug or the like is provided for connection to a voltage source. It will be appreciated that there are a variety of ways in which to package a modulator according to the present invention.

A plurality of holes 26 are placed in the membrane 15. In the preferred embodiment shown in FIG. 1, there are no holes 26 through the electrodes $18_{1-4}$. In other embodiments, however, the holes 26 can be located in the electrodes $18_{1-n}$ and through the membrane 15 beneath the electrodes. The holes are arranged in a regular manner, such as, without limitation, on a square or triangular lattice. The diameter of the holes 26 is typically in the range of about 3 to 5 microns.

The plurality of holes 26 serve a dual purpose. First, during fabrication of the modulator, the holes allow for the delivery of etchant beneath the layer 15a to create the cavity 20. Using holes in this manner is described in more detail in co-pending patent application Ser. No. 08/565,453 filed Feb. 1, 1996. Secondly, during operation, the holes provide for damping of the membrane 15 by allowing gas to escape from underneath the membrane 15. The gas underneath the membrane 15 can be, without limitation, air or a variety of other inert gases, e.g., helium, xenon and the like. As will be appreciated by those skilled in the art, the damping characteristics of the modulator can be adjusted by changing the type, as well as the pressure, of such gas.

Maximum damping is achieved when the distance, d, between each of the holes is given by: $d=2[(2Ph^2)/(12\pi\mu_{eff}f)]^{0.5}$, where P is the pressure of the gas through which the membrane 15 moves, h is the distance between the membrane and the substrate 10, $\mu_{eff}$ is the effective gas viscosity, and $f$ is equal to the data rate of the modulator when the modulator is operated in a return to zero operation and is equal to one-half of the data rate when the modulator is operated in a non-return to zero operation. These two modes of operation are discussed in more detail later in this specification. The effective gas viscosity, $\mu_{eff}$, may be expressed in terms of the gas viscosity, $\mu$, by the formula: $\mu_{eff}=\mu/\{1+[6(2-\sigma)\lambda/\sigma h]\}$, where $\sigma$ is the accommodation coefficient, which is a measure of how effectively a surface scatters gas molecules that impinge upon the surface, and typically has a value near 1, and $\lambda$ is the mean free path of the gas. Further information concerning the implementation of holes for damping is described in patent applications Ser. Nos. 08/597,003 and 08/565,453.

The substrate 10 is preferably conductive. Alternatively, a non-conductive substrate can be used and a conductive material deposited thereon or therein, preferably in a region of the substrate 10 underneath the electrodes 18. As used herein, the term "conductive substrate" refers to both of the above implementations. In preferred embodiments, the membrane 15 is silicon nitride and the substrate is silicon. The present modulators can be formed utilizing the materials and micromachining methods disclosed in co-pending U.S. patent applications Ser. No. 08/283,106 filed Jul. 29, 1994, Ser. No. 08/578,590 filed Jun. 7, 1995, Ser. No. 08/479,476 filed Jun. 7, 1995, Ser. No. 08/578,123 filed Dec. 26, 1995, Ser. No. 08/565,453 and Ser. No. 08/597,003, all of which are assigned to the present assignee. Other micromachining techniques known to those skilled in the art can be used as well, as appropriate.

In operation, a voltage is applied ("the biased state") across the electrodes, such as the electrodes $18_{1-4}$ and the substrate 10, generating an electrostatic force. This force causes the membrane 15 to move from an initial position, when the modulator is in the unbiased or quiescent state, towards the substrate 10. As the membrane 15 moves, there is a change in an optical property of the modulator. Such a change may be exploited to alter a measureable characteristic of an optical signal. For example, the reflectivity of the modulator may change as the layer moves, resulting in a change in the measured amplitude of the optical signal leaving the modulator. The change in reflectivity can be used to modulate the optical signal. Several such variable-reflectivity modulators are described in U.S. Pat. No. 5,500,761, and the aforementioned patent applications.

Micromechanical optical modulators are typically designed for a specific amount of membrane displacement. This predetermined displacement usually corresponds to a large change in the optical properties of the modulator in order to ensure a large contrast between the two states of the modulator, e.g., high reflectivity and low reflectivity. For example, the modulator may be designed for maximum reflectivity at a distance from the substrate of somewhat less than $3\lambda/4$ in the unbiased state and a minimum reflectivity at a distance of $\lambda/2$ from the substrate in the biased state, $\lambda$ being the wavelength of the optical signal being processed. Thus, the modulator is designed for a displacement under bias of about $\lambda/4$.

A particular drive voltage is required to achieve the aforementioned membrane displacement, as a function of modulator configuration. According to the present invention, multiple electrodes $18_{1-n}$, in conjunction with the controlled voltage source 25 and shift register 24 or other device for sequentially applying a voltage to the electrodes $18_{1-n}$, allow the modulator 1a to operate at lower voltages or higher data rates than prior art modulators while achieving the same membrane displacement, as described below.

As previously described, a disturbance or displacement is generated in the membrane 15 beneath an electrode $18_i$ as a result of a voltage, $V_i$, applied to the electrode. By virtue of the transmission-line configuration of a modulator according to the present invention, such disturbances propagate through the membrane 15 as a mechanical pulse. The propagating pulses generated beneath each electrode $18_i$ reinforce one another creating a displacement in the membrane 15, at the optical window 16, equivalent to the number, n, of electrodes $18_{1-n}$ times the displacement achieved by applying the voltage to a single electrode. In this manner, large membrane displacements can be generated from relatively low voltages.

It should be apparent that in the present modulator, the membrane 15 is multi-functional. First, the position of the membrane 15 relative to the substrate 10 controls the optical properties of the modulator. Secondly, the membrane 15 functions as a transmission line; and, in this capacity, it serves a dual purpose. In one function, the membrane 15 supports the mechanical pulse generated by the multiple electrodes and delivers it to the optical window 16. Regarding the second function, it will be appreciated by those skilled in the art that it is very difficult to achieve speeds above about 1–2 MHz for micromechanical modulators without membrane ringing unless some means for damping is provided. Indeed, in modulators according to the present invention, it should be understood that a mechanical pulse will be transmitted across the length of the membrane 15, propagating toward the side 27 of the perimeter 21, as well as toward the side 23. While it is desirable for the membrane 15 to transmit, to the optical window 16, the pulses generated in the membrane 15 beneath each electrode $18_{1-n}$, it is not desirable for the membrane to allow an appreciable amount of energy, i.e., a pulse, to be reflected from the side 27 and returned to the optical window. The length, $L_2$, of the membrane 15 is adjusted to provide, in conjunction with the holes 26, a predetermined amount of damping. Modulators operating at higher data rates will typically require longer membranes 15 to provide adequate damping than modulators operating at lower data rates. Thus, in a second function, in conjunction with the holes 26, the membrane 15 radiates energy away to prevent ringing. Using mechanical transmission lines for this purpose is described in co-pending application Ser. No. 08/597,003. The methods provided in Ser. No. 08/597,003 pertaining to the clamped-plate transmission line are applicable to the present invention.

Figure 2A:
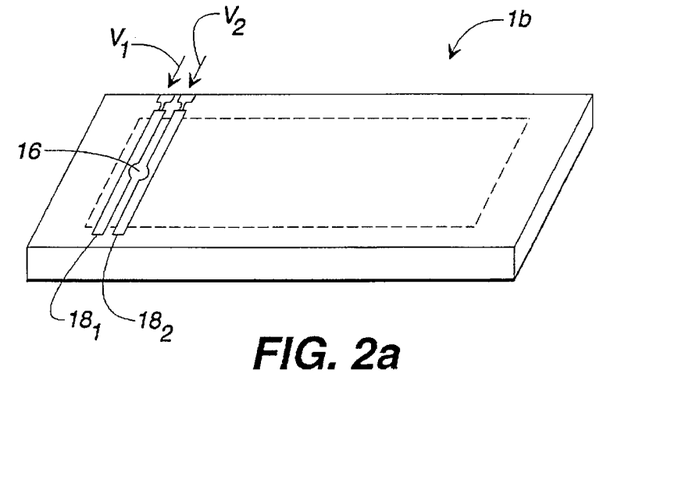
FIG. 2a is a low-voltage modulator according to the present invention having two electrodes.
Figure 2B:
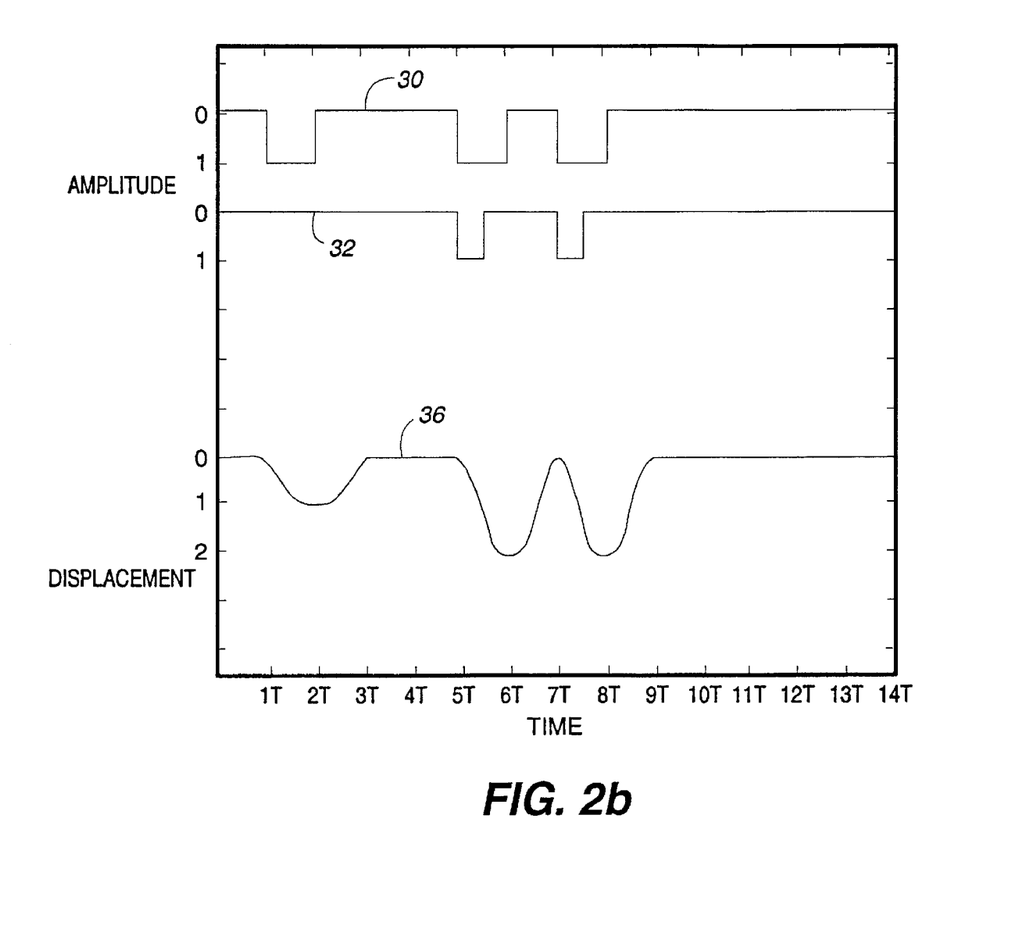

FIG. 2a is an illustration of an optical modulator 1b according to the present invention having two electrodes $18_1$ and $18_2$. A method of operating the modulator 1b is illustrated in FIG. 2b with a timing diagram. The timing diagram shows the sequencing and amplitude of the voltages, $V_1$ and $V_2$, applied across respective electrodes $18_1$ and $18_2$ and the substrate 10 of the modulator 1b. Trace 30 shows the pulse sequence for the voltage, $V_1$, at the first electrode, $18_1$, and trace 32 shows the pulse sequence for the voltage, $V_2$, at the second electrode, $18_2$. The response or displacement 36 of the membrane 15 at the optical window 16 is also shown.

The abscissa is divided into time integrals, T. The time, $T=2W/v$, is the shortest duration of a voltage pulse applied to the electrode $18_1$ that will produce maximum displacement of the membrane 15 at the optical window 16 for a given voltage. The time, T, will be referred to herein as the optimum pulse time. In the above expression, W is the width of the electrode $18_1$ and $v=(S/\rho)^{0.5}$ is the speed of propagation of mechanical pulses through the membrane 15 with S being the surface tension in the membrane 15 and $\rho$ being the combined mass per unit area of the membrane 15 and the electrode $18_1$.

FIG. 2b shows, for reference, a pulse of voltage $V_1$ applied to the electrode $18_1$ at time 1T. The pulse is turned off at time 2T. The response 36 of the membrane 15 at the optical window 16 is a displacement of one unit of height. Maximum displacement is reached at 2T. At 3T, the membrane 15 returns to its quiescent position, e.g., zero displacement. At time 5T, pulses of voltage $V_1$ and $V_2$ are applied to the electrodes $18_1$ and $18_2$, respectively. In a preferred embodiment, the amplitude of both voltage pulses are the same. The response 36 of the membrane 15 at the optical window 16 is a displacement of two units of height. That response is two times the response obtained when applying a voltage pulse of the same amplitude at a single electrode, as shown by comparison with the voltage pulse at time 1T.

Preferably, the voltage $V_2$ should be applied to the electrode $18_2$ at the same time that the voltage $V_1$ is applied to the electrode $18_1$ since the electrodes are the same distance from the optical window. In a further preferred embodiment, the voltage $V_2$ should be applied for a time equal to half of the optimum pulse time. The reason for such a shortened voltage pulse is that the duration of the resultant mechanical pulse in the membrane 15 at the optical window 16 begins to broaden significantly because of the extra amount of time that the membrane 15 is biased, i.e., held down, by electrode $18_2$. While modulators according to the present invention can be operated without shortening the voltage pulse of the second electrode to the nth electrode, modulator operating speed will be reduced as a result.

Figure 3A:
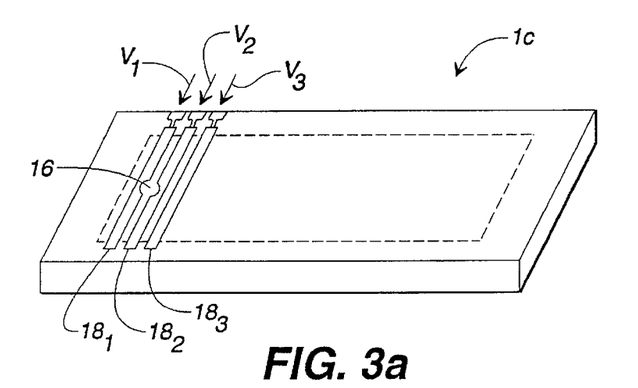
FIG. 3a is a low-voltage modulator according to the present invention having three electrodes.
Figure 3B:
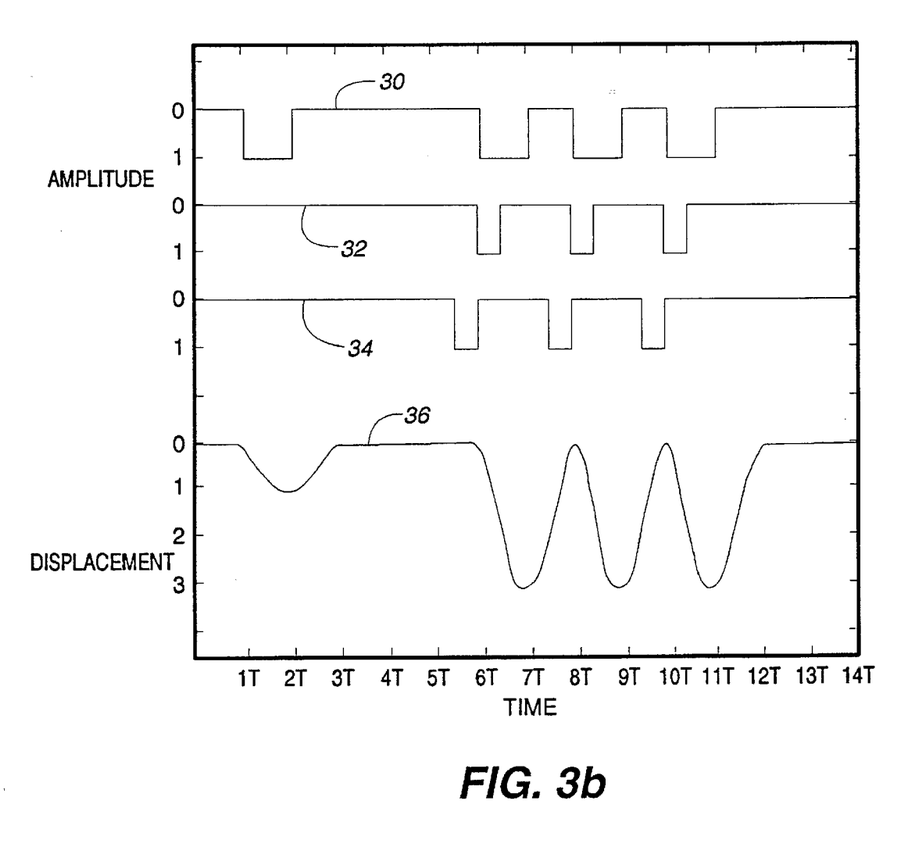

FIG. 3a is an illustration of an optical modulator 1c according to the present invention having three electrodes. A method of operating the modulator 1c is illustrated in FIG. 3b with a timing diagram. The timing diagram shows the sequencing and amplitude of the voltages $V_1$, $V_2$ and $V_3$ applied across respective electrodes $18_1$, $18_2$ and $18_3$ and the substrate 10 for the modulator 1c. Trace 30 is the pulse sequence for the voltage, $V_1$, at the first electrode, $18_1$, trace 32 is the pulse sequence for the voltage, $V_2$, at the second electrode, $18_2$, and trace 34 is the pulse sequence for the voltage, $V_3$, at the third electrode, $18_3$. The response 36 of the membrane 1 at the optical window 16 is shown.

FIG. 3b shows, for reference, a pulse of voltage $V_1$ applied to the electrode $18_1$ at time 1T. The voltage $V_1$ is turned off at time 2T. The response 36 of the membrane 15 at the optical window 16 is one unit of height. Maximum displacement is reached at 2T. At 3T, the membrane returns to zero displacement. At times 5.5T and 6T, voltages $V_3$, and $V_1$&$V_2$, respectively, are applied to the electrodes $18_3$, and $18_1$&$18_2$, respectively. Preferably, the amplitude of all three voltage pulses are the same. Pulses $V_2$ and $V_3$ are applied for a time T/2. The response 36 of the membrane 15 at the optical window 16 is displaced by three units of height. That response is three times the response obtained when applying a voltage pulse of the same amplitude at a single electrode. Voltage pulses are applied again at times 7.5T–8T and 9.5T–10T. As previously described, the membrane 15 moves from the quiescent position, to the biased position and back to the quiescent position in time 2T.

It should be understood that in FIGS. 2b and 3b, the single voltage pulse $V_1$ that was applied at time 1T was shown only for comparison with multi-electrode operation; applying a voltage pulse to the first electrode before applying a series of voltage pulses to electrodes $18_{1-n}$ is not required for modulators according to the present invention. Moreover, while an exemplary two series of voltage pulses, e.g., at 5T and 7T, are shown in FIG. 2b for a two-electrode modulator, and an exemplary three series of voltage pulses, e.g., at 6T, 8T and 10T, are shown for a three-electrode modulator, there is no relationship between the number of applied voltage pulses and the number of electrodes in the modulator.

Since the electrode $18_3$ is further from the optical window 16 than electrodes $18_1$ or $18_2$, the mechanical pulse or displacement generated in the membrane 15 beneath the electrode $18_3$ has further to travel than the mechanical pulse generated at the electrodes $18_1$ or $18_2$. The extra travel distance is the width, W, of the electrode $18_3$. The mechanical pulse travels the distance W in time T/2. As such, the voltage pulse $V_3$ is preferably applied to the electrode $18_3$ at a time T/2 earlier than the time that voltage pulses $V_1$ and $V_2$ are applied at the electrodes $18_1$ and $18_2$. Thus, in FIG. 3b, the voltage pulse $V_3$ is applied at time 5.5T while the voltage pulses $V_1$ and $V_2$ are applied at time 6T. To generalize, the pulse sequence for the ith electrode is obtained by shifting the pulse sequence for the second electrode $18_2$ by the amount $(i-2)W/v$. Moreover, in a further preferred embodiment, voltage pulses $V_{2-n}$ are applied for the time T/2, for the reason previously described.

The displacement of the membrane 15 is a function of the electrostatic pressure, $P_i = \epsilon V_i^2/(2h_i^2)$, where $V_i$ is the applied voltage, $\epsilon$ is the effective dielectric constant between the electrode $18_i$ and the substrate and $h_i$ is the distance between the membrane 15 and the substrate 10 beneath the electrode $18_i$. According to the above expression, the electrostatic pressure, $P_i$, and therefore the membrane displacement, are proportional to the square of the voltage.

Thus, Table 1 below gives membrane displacement as a funtion of voltage for a prior art single-electrode modulator, and Table 2 gives membrane displacement as a function of voltage for a multiple-electrode modulator according to the present invention. In Table 2, the applied voltage was assumed to be constant at $\sqrt{2}$ volts.

TABLE 1

Single-Electrode Modulator

| Voltage Applied to Electrode | Displacement of Membrane at Optical Window |
|---|---|
| $\sqrt{2}$ | 2 |
| 2 | 4 |
| 3 | 9 |
| 4 | 16 |

TABLE 2

Multiple-Electrode Modulator

| Number, n, of Electrodes | Voltage Applied to Each Electrode | Displacement at each Electrode due to Voltage pulse to each Electrode | Displacement at the Optical Window |
|---|---|---|---|
| 1 | $\sqrt{2}$ | 2 | 2 |
| 2 | $\sqrt{2}$ | 2 | 4 |
| 3 | $\sqrt{2}$ | 2 | 6 |
| 4 | $\sqrt{2}$ | 2 | 8 |

Thus, using a four-electrode modulator according to the present invention, such as the modulator 1a, the membrane 15 is displaced 8 units at the optical window 16 for a voltage pulse at each electrode $18_{1-4}$ of $\sqrt{2}$ volts. By comparison, prior art one-electrode modulators would require a voltage of $\sqrt{8}$ or 2.8 for the same displacement. Multi-electrode optical modulators according to the present invention reduce voltage requirements by a factor of $\sqrt{n}$.

In many prior art micromechanical modulators, the resonant frequency of an optical modulator controls the data rate of the modulator. The data rate is simply twice the resonant frequency. The resonant frequency of such modulators is typically a function of, among other things, the tension, S, in the membrane. So, the data rate can be increased by increasing the tension in the membrane. As membrane tension rises, however, drive voltage requirements increase for obtaining a given membrane displacement. To obtain such displacement at a higher membrane tension, the applied voltage may eventually reach the point at which dielectric breakdown occurs.

For micromechanical optical modulators according to the present invention, the data rate is controlled by the time it takes for a mechanical pulse to propagate between the optical window 16 and a side 23 of the perimeter 21 of the cavity 20 nearest the optical window 16, and back to the optical window again. That propagation time is expressed as $T=2W/v$, which was previously described to be the optimum pulse time for applying a voltage to the first electrode, $18_1$. The data rate, $R_D$, may be expressed in terms of T as $R_D=1/(2T)$. Thus, to increase the data rate, the propagation time, T, should be minimized. As such, W should be minimized and $v$ should be maximized. As previously described, $v$, the speed of propagation of mechanical pulses through the membrane 15 is given by $v=(S/\rho)^{0.5}$ with S being the surface tension in the membrane and $\rho$ being the mass per unit area. To maximize propagation speed, therefore, the tension S should be maximized and $\rho$ should be minimized. Thus, like prior art micromechanical optical modulators, the data rate can be increased by increasing membrane tension. As previously described, increasing the tension increases drive voltage requirements, and the ability to increase drive voltage may be limited by the phenomenon of dielectric breakdown. By using the multiple-electrode arrangement of modulators according to the present invention, voltage requirements for a given membrane displacement are reduced relative to prior art single electrode modulators. Thus, the present modulators can operate with higher tension membranes than typical prior art modulators, hence achieving higher data rates.

Several further preferred embodiments of modulators according to the present invention are described below. In one such preferred embodiment, the dimension, $L_1$, of the modulator, shown in FIG. 1, which is effectively the length of the electrodes $18_{1-n}$, should be large compared to the width, W, of the electrodes. Such a configuration should help minimize the generation of secondary pulses from waves launched at the corners of the membrane 15. The ratio $L_1:W$ should be at least 5:1, and more preferably at least 10:1. Moreover, as previously noted, the data rate of the modulator, $R_D=1/(2T)$ is maximized by minimizing electrode width W since $T=2W/v$. Thus, as modulator speed increases, the ratio $L_1:W$ will tend to increase.

Figure 4:
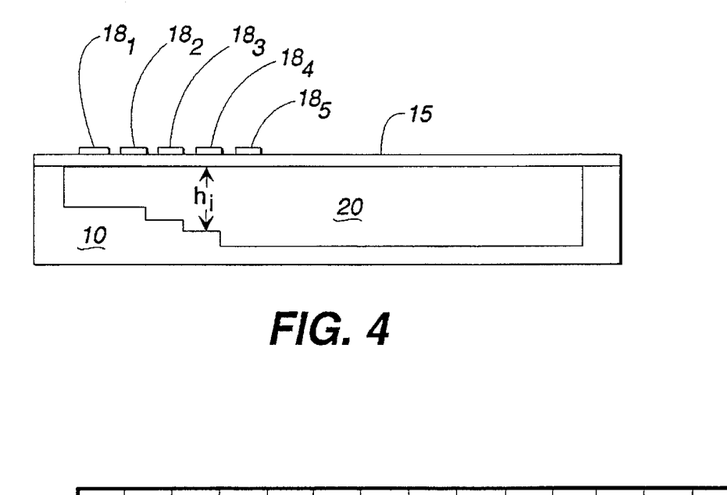
FIG. 4 is a cross-sectional view of the low-voltage optical modulator of FIG. 1.

In another preferred embodiment, the gap or distance, $h_i$, between the membrane 15 and substrate 10 underneath each successive electrode $18_{3-n}$ increases, as shown in FIG. 4. This is desirable for the following reason. The displacement in the membrane 15 at the optical window 16 for an multi-electrode modulator according to the present invention is simply n times the displacement for a similarly constructed 1-electrode modulator. Membrane displacement at regions near the middle 14 of the membrane 15 may be greater, however, than the membrane displacement near the optical window 16. The gap between the membrane 15 and the substrate 10 must be large enough to accomodate such membrane travel. It is within the capabilities of those skilled in the art to apply the appropriate wave equations to determine the required gap at various locations under the membrane 15. Alternatively, the gap, $h_i$, can be uniform through out the cavity 20. Such a uniform gap increases the distance between the electrodes $18_{1-n}$ and the substrate 10 relative to the aforementioned stepped configuration, especially at regions of the membrane 15 closest to the optical window 16, resulting in increased drive voltage requirements.

Adjacent electrodes, such as, for example, electrodes $18_{i-1}$, $18_i$ and $18_{i-1}$, should be spaced sufficiently far apart to prevent dielectric breakdown at the anticipated operating voltage. The space 17 between adjacent electrodes can be calculated by those skilled in the art or determined by routine experimentation. A spacing 17 of one or more microns is believed to be suitable.

Table 3 below shows some hypothetical designs for the n-electrode optical modulators according to the present invention. In the table, device speed is in million of bits per second and all dimensions are in microns. For all modulators, membrane width, $L_1$=150 microns; membrane length, $L_2$, is that length required so that the pulse height returned by the membrane 15 back to the optical window 16 is attenuated by a factor of 10; the spacing 17 between electrodes is 2 microns, which amount should be subtracted from the values presented below for electrode width; holes 26 have a diameter of 4 microns; the required amount of membrane displacement under bias is $\lambda/4$; and all modulators have four electrodes.

TABLE 3

Hypothetical Low-Voltage Modulator Designs

| Device Speed | Electrode Width | Adjacent Holes Spacing | Drive Voltage, <volts> | Membrane Length |
|---|---|---|---|---|
| 10 | 9.6 | 10.1 | 116 | 1550 |
| 7 | 13.8 | 12.1 | 80 | 1090 |
| 5 | 19.3 | 14.1 | 58 | 780 |

As is known to those skilled in the art, the voltage, V, required for a predetermined displacement, h, of the membrane 15 at the center of the optical window is given by: $V=(2h_o/W)[(hS_s/\epsilon)]^{0.5}$, where $h_o$ is the distance between the electrode $18_1$ and the substrate, $\epsilon$ is the effective dielectric constant, W is the width of the electrode $18_1$, and $S_s$ is the surface tension in the membrane 15.

The foregoing discussion of modulator operation pertained to applying the voltage, $V_i$, in a return to zero mode of operation, i.e., after applying a voltage to send a bit, return to zero voltage before sending another bit. In a preferred embodiment, the modulator operates in a nonreturn to zero mode of operation. In such a mode of operation, if a bit is to be sent in two consecutive time periods, the voltage is maintained at the appropriate amplitude without returning to zero to send the second bit.

In the non-return to zero mode of operation, the operating frequency of the present modulator is equal to one-half of the data rate, while in the return to zero mode of operation, the frequency is equal to the data rate. As a consequence, the drive voltage required for the same amount of membrane displacement as when operating in the return to zero mode of operation is reduced by a factor of $1/\sqrt{3}$. Thus, the drive voltages shown in Table 3 would be reduced to 67 volts for 10 Mbits/s, 42 volts for 7 Mbits/s and 34 volts for 5 Mbits/s for the non-return to zero mode of operation. Furthermore, the length of the membrane 15 required for a given amount of attenuation of the mechanical pulse is half of that required when operating in a return to zero mode of operation. Additionally, the optimum spacing between the damping holes 26 is increased by about a factor of $\sqrt{2}$ relative to the optimum spacing in a return to zero mode of operation.

Figure 5:
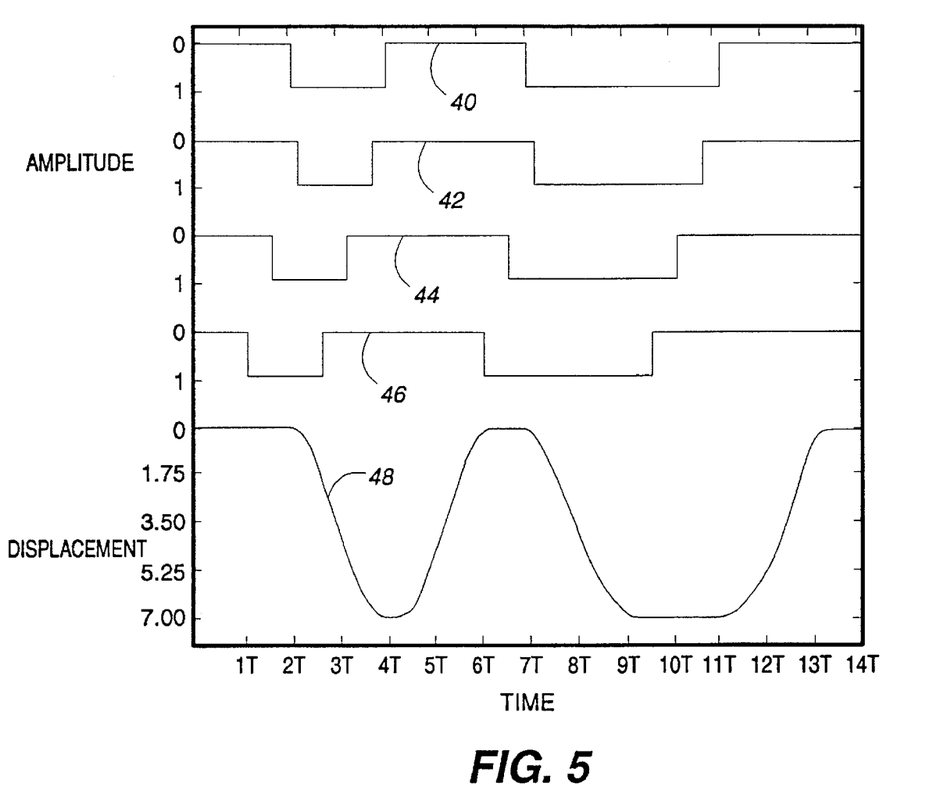
FIG. 5 is a timing diagram for the applied electrostatic pressure and shows the membrane response for a four-electrode modulator wherein the modulator is operated in a non-return to zero mode.

FIG. 5 shows a timing diagram, for non-return to zero operation, for the electrostatic pressure generated at each electrode in a four-electrode modulator, such as the modulator 1a. As previously described, the electrostatic pressure, $P_i$, on the membrane 15 at the electrode $18_i$ is given by: $P_i=\epsilon V_i^2/(2h_i^2)$. Trace 40 shows the electrostatic pressure $P_1$, applied on the membrane 15 at the electrode $18_1$, trace 42 shows the electrostatic pressure, $P_2$, applied on the membrane 15 at the electrode $18_2$, trace 44 shows the electrostatic pressure, $P_3$, applied on the membrane 15 at the electrode $18_3$, and trace 46 shows the electrostatic pressure, $P_4$, applied on the membrane 15 at the electrode $18_4$. Trace 48 shows the response of the membrane 15 at the optical window 16.

The minimum pulse length, $T_p$, to attain the full on value, i.e., predetermined desired displacement of the membrane, is $T_p=4W/v$. This is twice the time interval, T, that it takes to attain the full on value for the return to zero mode of operation. Preferably, the pulses of electrostatic pressure, $P_1$ and $P_2$, applied to the membrane 15 underneath the electrodes $18_1$ and $18_2$ are applied at the same time, 2T. The pulse P2, however, preferably has a duration of $T_p/4$ or $T/2$ less than the pulse $P_1$. Preferably, pulses $P_3$ and $P_4$ have the same duration as the pulse $P_2$, however, they are applied earlier in time according to the previously presented expression, $(i-2)W/v$. In non-return to zero operation, the displacement obtained at the optical window 16 when applying the same electrostatic pressure to the membrane 15 beneath each of n electrodes in the present modulator is equal to $(2n-1)$ times the displacement obtained when the same electrostatic pressure is applied only at the optical window.

Although a number of specific embodiments of this invention have been shown and described herein, it is to be understood that these embodiments are merely illustrative of the many possible arrangements and modes of operation that can be devised in application of the principles of this invention. Numerous and varied other arrangements and methods can be devised in accordance with these principles by those of ordinary skill in the art without departing from the scope and spirit of the invention. For example, in a preferred embodiment, modulators according to the present invention are operated so that the voltage pulses applied at each electrode have the same amplitude. In other embodiments, however, the amplitude of the voltage pulses, $V_{1-n}$, applied to the various electrodes, $18_{1-n}$, can be different. Furthermore, in the exemplary embodiments of modulators according to the present invention, the layer 15a is shown disposed directly on the substrate 10. It will be appreciated that in other embodiments, other layers can be interposed between the substrate 10 and the layer 15a. Also, the electrodes 18 can be spaced significantly further apart than the 2 micron spacing described for the exemplary modulators shown in Table 3 by suitably increasing the delay time for the applied voltage.

I claim:

1. A micromechanical optical modulator for modulating an optical signal received by the modulator at an optical window, comprising:

two spaced-apart layers, one of the layers being movable, the movable layer capable of propagating a pulse to the optical window defined therein, the optical window having a first position relative to the other layer in the absence of a voltage signal; and at least a first and a second electrode, the first electrode disposed on a first region of the movable layer and the second electrode disposed on a second region of the movable layer, wherein the electrodes are electrically insulated from each other; wherein, when a first voltage is applied to the first electrode, the first region of the movable layer moves toward the other layer creating a first pulse, and when a second voltage is applied to the second electrode, the second region of the movable layer moves toward the other layer creating a second pulse, wherein the first and second pulses propagate to the optical window via the movable layer causing a pulse at the optical window about equal to the sum of the first and the second pulse, and wherein the optical window moves from its first postion to a second position towards the other layer as a result of the pulse, the change in position of the optical window resulting in a change in modulator reflectivity.

2. The micromechanical optical modulator of claim 1 further comprising a shift register that receives a voltage signal from a controlled voltage source and delivers it, according to a clock signal, to the first electrode and to the second electrode.

3. The micromechanical optical modulator of claim 1 further comprising a controlled voltage source for supplying a voltage to the first and second electrode.

4. The micromechanical optical modulator of claim 1 wherein the movable layer provides a predetermined amount of attenuation to pulses returned to the optical window.

5. The micromechanical optical modulator of claim 4 wherein the movable layer attenuates the returning pulses by a factor of at least ten.

6. The micromechanical optical modulator of claim 4 wherein the movable layer further comprises a plurality of holes.

7. The micromechanical optical modulator of claim 6 wherein the holes have a diameter ranging from about 3 to about 5 microns.

8. The micromechanical optical modulator of claim 7 wherein each hole of the plurality of such holes is spaced from the next nearest hole according to the expression $d=2[(2Ph^2)/(12\pi\mu_{eff}f)]^{0.5}$, where P is pressure of a gas between the movable layer and the other layer, h is the distance between the movable layer and the other layer, $f$ is equal to the data rate of the modulator when the modulator is operated in a return to zero mode of operation and is equal to one-half of the data rate when the modulator is operated in a non-return to zero mode of operation, and $\mu_{eff}$ is effective gas viscosity, which is given by $\mu_{eff}=\mu/\{1+[6(2-\sigma)\lambda/\sigma h]\}$, where $\sigma$ is the accommodation coefficient, and $\lambda$ is the mean free path of the gas.

9. The micromechanical optical modulator of claim 1 wherein the movable layer is characterized by a length and a width, and the ratio of the length to the width is at least 5.

10. The micromechanical optical modulator of claim 1 further comprising a first optical fiber for delivering the optical signal to the optical window.

11. The micromechanical optical modulator of claim 1 further comprising at least a third electrode disposed on a third region of the movable layer.

12. The micromechanical optical modulator of claim 1 wherein the movable layer is silicon nitride.

13. The micromechanical optical modulator of claim 1 wherein the other layer is silicon.

14. An electromechanical optical modulator capable of achieving data rates of 5 million bits per second or more, comprising:
a conductive substrate;
a vertically-movable membrane superposed over the substrate and defining a cavity therebetween, the membrane characterized by a length of more than 300 microns and having an optical window near one end of the membrane;
a first, second, third and fourth electrode disposed on the membrane, wherein the electrodes are less than 20 microns in width and are characterized, respectively, by a first, second, third and fourth distance to the optical window; and means for sequentially applying a voltage to each of the four electrodes wherein the sequence in which the voltage is applied to the electrodes is a function of the first, second, third and fourth distance.

15. A method for operating a micromechanical modulator having at least a first and a second electrode disposed on a membrane, wherein the first electrode is disposed nearest a first end of the membrane and the second electrode is disposed next to the first electrode and an optical signal receiving region of the membrane is defined between the first and second electrode, and each electrode is characterized by a width, and the membrane is characterized by a speed at which mechanical pulses propagate, comprising the steps of:
providing an optical signal to the optical signal receiving region of the membrane;
generating a first mechanical pulse having a first amplitude in the membrane beneath the first electrode;
generating a second mechanical pulse having a second amplitude in the membrane beneath the second electrode; and
propagating the first and second pulses to the optical signal receiving region of the membrane so that the pulses constructively interfere resulting in a third pulse in the optical signal receiving region having an amplitude greater than that of the first or the second pulse.

16. The method of claim 15 wherein the amplitude of the first pulse is the equal to the amplitude of the second pulse.

17. The method of claim 15 wherein the first and the second pulse are each characterized by a duration, and wherein the duration of the first pulse is twice the duration of the second pulse.

18. The method of claim 15 wherein the step of generating a first mechanical pulse further comprises applying a first voltage to the first electrode at a first time for a first period of time and the step of generating a second mechanical pulse further comprises applying a second voltage to the second electrode at a second time for a second period of time.

19. The method of claim 18 wherein the first voltage is equal to the second voltage.

20. The method of claim 18 wherein the first time is equal to the second time.

21. The method of claim 18 wherein the first period of time is twice as long as the second period of time.

22. The method of claim 18 wherein the first period of time is given by T=2W/v, where W is the width of the first electrode and v is the speed at which the mechanical pulses propagate through the membrane.

23. The method of claim 22 wherein the second period of time is given by T/2.

24. The method of claim 18 wherein the first and second voltages are applied in a non return to zero mode of operation.

25. The method of claim 24 wherein the first period of time is given by T=4W/v, where W is the width of the first electrode and v is the speed at which the mechanical pulses propagate through the membrane.

26. The method of claim 25 wherein the second period of time is given by 3/4T.

27. The method of claim 15 wherein the pulses are timed to arrive at the optical signal receiving region at the same time so that the amplitude of the pulse at the optical signal receiving region is approximately equal to the sum of the first amplitude and the second amplitude.

28. The method of claim 15 further comprising the step of:
generating a third mechanical pulse having a third amplitude in the membrane beneath a third electrode, wherein the third electrode is disposed on the membrane nearest the second membrane and wherein the step of propagating further comprises propagating the first, second and third pulses to the optical signal receiving region of the membrane.

29. The method of claim 28 wherein the first, the second and the third pulse are each characterized by a duration, and wherein the duration of the first pulse is twice the duration of the second pulse and the third pulse.

30. The method of claim 28 wherein the step of generating a first mechanical pulse further comprises applying a first voltage to the first electrode at a first time for a first period of time, the step of generating a second mechanical pulse further comprises applying a second voltage to the second electrode at a second time for a second period of time and the step of generating a third mechanical pulse further comprises applying a third voltage to the third electrode at a third time for a third period of time.

31. The method of claim 30 wherein the first voltage is equal to the second voltage is equal to the third voltage.

32. The method of claim 30 wherein the first time is equal to the second time, and the third time is earlier than the first or the second time by the amount $W/v$, where W is the width of the third electrode and $v$ is the speed at which the mechanical pulses propagate through the membrane.

33. The method of claim 30 wherein the first period of time is twice as long as the second and the third period of time.

34. The method of claim 30 wherein the first period of time is given by $T=2W/v$, where W is the width of the first electrode and $v$ is the speed at which the mechanical pulses propagate through the membrane.

35. The method of claim 34 wherein the second and the third period of time is given by $T/2$.

36. The method of claim 30 wherein the first, second and third voltages are applied in a non return to zero mode of operation.

37. The method of claim 28 wherein the pulses are timed to arrive at the optical signal receiving region at the same time so that the amplitude of the pulse at the optical signal receiving region is approximately equal to the sum of the first, the second and the third amplitude.

38. A method for operating a micromechanical modulator having a number, n, of electrodes disposed on a membrane, wherein n is greater than 2 and the first electrode is located nearest a first end of the membrane and the second electrode is located next to the first electrode and wherein an optical signal receiving portion of the membrane is defined therebetween, and further wherein each electrode is characterized by a width, and the membrane is characterized by a speed at which mechanical pulses propagate, comprising the steps of:

providing an optical signal to the optical signal receiving region of the membrane;

generating a first mechanical pulse having a first amplitude in the membrane beneath a first electrode at a time T;

generating a second mechanical pulse having a second amplitude in the membrane beneath the second electrode at the time T;

generating an "i"th mechanical pulse having an "i"th amplitude in the membrane beneath the "i"th electrode at a time $T-[(i-2)W/v]$, wherein "i" refers individually to the third to the nth electrode; and propagating the first to the "n"th pulses to the optical signal receiving portion of the membrane; wherein, the pulses are timed to arrive at the optical signal receiving region at the same time so that the amplitude of the pulse at the optical signal receiving region is approximately equal to the sum of the amplitudes of the first to the "n"th pulse and results in the membrane moving a predetermined amount of distance toward a region of substrate spaced from the membrane.

39. The method of claim 38 wherein the first and the second through the "n"th mechanical pulses are generated for respective first and second time periods.

40. The method of claim 39 wherein the first time period is given by $T=2W/v$, where W is the width of the first electrode and $v$ is the speed at which the mechanical pulses propagate through the membrane.

41. The method of claim 40 wherein the second time period is $T/2$.

42. The method of claim 38 wherein the first period of time is given by $T=4W/v$, where W is the width of the first electrode and $v$ is the speed at which the mechanical pulses propagate through the membrane.

43. The method of claim 42 wherein the second period of time is given by $3/4T$.

44. The method of claim 38 wherein the predetermined distance is $\lambda/4$, where $\lambda$ is the wavelength of the optical signal.

* * * * *